(12) United States Patent  
Kim

(10) Patent No.: US 7,266,148 B2
(45) Date of Patent: Sep. 4, 2007

(54) VIDEO TRANSCODING APPARATUS

(75) Inventor: Eung Tae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 511 days.

(21) Appl. No.: 10/034,380

(22) Filed: Jan. 3, 2002

(65) Prior Publication Data

US 2002/0126752 A1    Sep. 12, 2002

(30) Foreign Application Priority Data

Jan. 5, 2001  (KR) ................................. 2001-605
Jun. 23, 2001 (KR) ............................... 2001-36039

(51) Int. Cl.
  *H04B 1/66*  (2006.01)
(52) U.S. Cl. ........................... 375/240.03; 375/240.05; 375/240.07; 375/240.25; 375/240.26; 382/251; 382/233; 382/239; 382/246; 382/245
(58) Field of Classification Search .......... 375/240.03, 375/240.05, 240.06, 240.16, 240.21, 240.23, 375/240.24, 240.25, 240.26, 240.07; 370/468; 382/233, 240, 251, 239, 246, 245
See application file for complete search history.

(56) References Cited

U.S. PATENT DOCUMENTS 5,253,041 A * 10/1993 Wine et al. ................. 348/448
5,541,852 A * 7/1996 Eyuboglu et al. ........... 709/232
6,044,115 A * 3/2000 Horiike et al. .......... 375/240.05
6,058,143 A * 5/2000 Golin .................... 375/240.16
6,310,915 B1* 10/2001 Wells et al. ............ 375/240.03
6,621,866 B1* 9/2003 Florencio et al. ...... 375/240.25
6,898,243 B1* 5/2005 Alvarez ................. 375/240.14

* cited by examiner

Primary Examiner—Shawn S. An
(74) Attorney, Agent, or Firm—Ked & Associates, LLP

(57) ABSTRACT

Disclosed is a video transcoding apparatus converting a specific bit rate of an MPEG (moving pictures experts group) bit stream into a different rate thereof for transportation. The present invention includes a video pre-processing unit having a predetermined matrix structure and down-sampling a macro block decoded by the video decoder by transforming the macro block into a corresponding picture structure to the compressed video bit stream, a transcoding parameter control unit detecting information about a picture from a previous bit stream variable-length-decoded by the video decoder and setting up an encoding mode for a transcoding in accordance with the detected information, etc. Therefore, the present invention does not need the motion estimation unit of encoder and reduce the complexity of the bit allocation unit. When changing HD-rated MPEG sequence over 10 Mbps into NTSC-rated MPEG sequence below 6 Mbps, the present invention reduces calculation time and complexity of hardware.

25 Claims, 8 Drawing Sheets decoded macro blocks of high resolution down-scaled macro block to be encoded currently

| MB 1 | MB 2 | MB 3 | MB 4 | result |
|------|------|------|------|--------|
| Intra | Intra | Intra | Intra | |
| Inter | Intra | Intra | Intra | |
| Intra | Inter | Intra | Intra | |
| Intra | Intra | Inter | Intra | Intra |
| Intra | Intra | Intra | Inter | |
| Inter | Intra | Intra | Inter | |
| Intra | Inter | Inter | Intra | |
| | otherwise | | | Inter |

$$\overline{MV} = \frac{\sum\limits_{i=1}^{4} MV_i \cdot A_i}{\sum\limits_{i=1}^{4} A_i} \text{, where } A_i = \begin{cases} 1, \text{Non-intra} \\ 0, \text{Intra} \end{cases}$$

$\text{Med}(MV) = \text{median}(MV_i, i=1,...,4)$

VIDEO TRANSCODING APPARATUS

BACKGROUND OF THE INVENTION

1. Field of the Invention

The present invention relates to a digital TV or digital video appliance, and more particularly, to a video transcoding apparatus converting a specific bit rate of an MPEG (moving pictures experts group) bit stream into a different rate thereof for transportation.

2. Background of the Related Art

Lately, encoders such as MPEG and the like are used for reducing storage and transmission capacity of a digital video or audio. Specifically, required are various applications such as video search, picture-in-picture (PIP), video coupling, video edition, transport bit rate conversion, and the like, in which video transcoding methods converting an MPEG bit stream having a specific bit rate are demanded so as to have another bit ratio. For instance, a bit stream of JPEG (joint photographic coding experts group) is converted into an MPEG bit stream, a DV (digital video) format as a digital output of a digital camcorder is converted into an MPEG bit stream, and an MPEG bit stream of HD (high definition) is converted into the MPEG bit stream of SD (standard definition).

FIG. 1 illustrates a block diagram of a general video transcoding apparatus.

Referring to FIG. 1, a video transcoding apparatus includes a decoding unit 10, a frame memory 20 storing an output of the decoding unit 10 for a video transcoding, an encoding unit 30 converting a bit rate of a video stored in the frame memory 20 into a different bit rate, and a bit rate control unit 50 controlling a bit rate of the encoding unit 30.

Namely, a variable length decoding (VLD) unit of the decoding unit 10 decodes an inputted video bit stream by VLD so as to divide the bit stream into a motion vector, a quantized value, a DCT (discrete cosine transform) coefficient, and then outputs the motion vector MV to a motion compensation unit 16 and the quantized value and DCT coefficient to an inverse quantized (IQ) unit 12. The IQ unit 12 inverse-quantizes the DCT coefficient in accordance with the quantized value, and then outputs the inverse-quantized value to an IDC unit 13. The IDCT unit 13 carries out IDCT on the inverse-quantized DCT coefficient so as to output the IDCT value to an adder 14. If the decoding unit 10 is a general MPEG-2 video decoder, the IDC unit 13 carries out the IDCT by an 8*8 block unit suitable for an MPEG-2 video syntax.

In this case, forms of pictures standardized by MPEG include I, P, and B pictures. Data restored by the IDCT unit 13 are the I pictures, which is a perfect picture able to be displayed intact. The data of the B or P picture are an imperfect picture requiring a motion compensation through the motion compensation unit 16.

Namely, by taking the I picture as a reference, the motion vector representing a motion is regarded as '0'. When it is the B or P picture, the original image should be restored using the previous picture stored in a memory unit 15. In this case, the motion vector means a 2-dimensional vector representing an offset of a coordinate of a field taken as a reference frame from a current picture or a field coordinate for the motion compensation.

Therefore, the motion vector outputted from the VLD unit 11 is outputted to the motion compensation unit 16. The motion compensation unit 16 carries out the motion compensation for a present pixel value using the motion vector and the previous frame stored in the memory 15, and then outputs the result to the adder 14. Namely, the motion compensation unit 16 predicts one direction or bi-directions using the motion vector of the present B or P picture outputted from the VLD unit 13 and the previous picture stored in the memory 15, thereby restoring the B or P picture into a perfect video.

The adder 14 restores the perfect video as a final pixel value by adding the IDCT (inverse discrete cosine transform) value to the motion compensation value, and then stores it in the memory for the motion compensation and the frame memory 20 for the video transcoding. Namely, the IQ/IDCT result is directly stored in the memories 15 and 20 for the I picture. But, the compensation data and IDCT result are added together by the adder 14 for the P or B picture, and then stored in the memories 15 and 20.

In this case, in order to convert the video stored in the memory 20 into a bit stream having a low transport bit rate and store the bit stream in a storage device such as a hard disk, a video encoder such as the encoding unit 30 is used.

Namely, if data outputted from the frame memory 20 is the I picture, a subtracter 31 in the encoding unit 30 outputs the data to a DCT unit 32 as it is. But, if the data outputted from the frame memory 20 is the P or B picture, the adder 31 outputs a differential data to the DCT unit 32. The differential data results from the data of which motion is compensated in the motion compensation unit 39. The DCT unit 32 then carries out DCT on the inputted data, and outputs the DCT data to a quantizing unit 33 for quantization.

In such a procedure, the DCT unit 32 removes a relationship of the data through a 2-dimensional axis transformation, in which a picture is divided into block units each of which axis is transformed in accordance with the DCT method. The axis-transformed data tend to be driven into one direction (toward low pass). The quantizing unit 33 quantizes the driven data only with a predetermined quantizing interval, and then outputs the quantized data to a VLC (variable length coding) unit 34. The VLC unit 34 represents a frequent value by a low number of bits and a rare value by a high number of bits, thereby reducing total bit number.

In this case, the data on which VLC is carried out in the VLC unit 34 is outputted to a buffer 40. The buffer 40 stores the VLC data temporarily, outputs the VLC data to the storage device such as hard disk at a constant speed, and outputs the VLC data to the bit rate control unit 50 by calculating a fullness of the buffer 40.

Namely, the MPEG bit stream of a specific bit rate is transformed into that of a different bit rate such as a low transport bit rate using the decoding and encoding units 10 and 30, and then stored in the storage device.

Moreover, the DCT coefficient quantized by the quantizing unit 33 is inputted to the IQ unit 35 again for inverse quantization, and then outputted to the IDCT unit 36. The IDCT unit 36 carries out IDCT on the inverse-quantized DCT coefficient, and then outputs the IDCT coefficient to the adder 37. The adder 37 adds the IDCT value to the motion compensated value so as to restore a perfect video as a final pixel value, and then stores the added value in a memory 38 for the motion compensation. The motion compensation unit 39 carries out the motion compensation using the previous frame read from the memory 38, and then outputs the motion-compensated value to the subtracter 31 and the adder 37.

As mentioned in the above explanation in FIG. 1, a specific bit rate of the MPEG bit stream is converted into a different bit rate such as a low transport bit rate using the decoding and encoding units 10 and 20, and the result is stored in the storage device such as a hard disk.

A bandwidth of a HDTV transmission channel is fixed, while a generated data amount varies in accordance with time since video data are variable-length-coded (VLCed) finally. In order to adjust the generated data amount to keep up with a given transmission rate, the bit rate control unit 50 is required. The bit rate control unit 50 varies a step size of the quantizing unit 33 mainly in accordance with a fullness of the buffer 40 so as to control the generated data amount. Namely, as the data amount filling the buffer 40 increases if a generated bit number is higher than a reference, a following bit number is reduced by increasing a quantizing step size. If the generated data amount is lower than the reference, the quantizing step size is reduced so as to increase the generated bit number. Thus, a state of the buffer 40 is controlled so as to maintain a predetermined value overall.

In this case, when referring to MPEG-2 statements (test model 5, file No. AVC-491) in progress of standardization by a subordinate organization, IS/IEC JTC/SC29/WG11, of ISO (international organization for standardization), the bit rate control unit 50 carries out the following three steps.

A first step predicts a complexity and allocates a target bit. Namely, a predetermined bit rate is allocated by GOP (group of pictures) unit in accordance with a transport bit rate, and bits to be allocated in GOP are allocated in accordance with the complexity of each of the pictures (I, P, and B frames). In this case, each complexity X of the I, P, and B pictures after encoded is attained by the following formula 1.

[Formula 1]

$$X_i = S_i Q_i$$

$$X_p = S_p Q_p$$

$$X_b = S_b Q_b,$$

where $S_i$, $S_p$, and $S_b$ are bit amounts generated after the I, P, and P pictures are encoded, and $Q_i$, $Q_p$, and $Q_b$ are average values of quantizing parameters used for encoding all the macro blocks of the respective pictures, respectively. And, initial complexities are given as $X_i = 160 *$bit rate$/115$, $X_p = 60 *$bit rate$/115$, and $X_b = 42 *$bit rate$/115$, where each of the bit rates is found by 'bit number/second'.

Namely, target bits $T_i$, $T_b$, and $T_p$ of the I, P, and B pictures to be encoded in accordance with the bit rates of the I, P, and B pictures as video transcoded forms, respectively, are allocated by the following formula 2.

$$T_i = \max\left\{ \frac{R}{1 + \frac{N_p X_p}{X_i X_p} + \frac{N_b X_b}{X_i X_b}}, \frac{\text{bit\_rate}}{8 \times \text{picture\_rate}} \right\} \quad [\text{Formula 2}]$$

$$T_p = \max\left\{ \frac{R}{N_p + \frac{N_b K_p X_b}{K_b X_p}}, \frac{\text{bit\_rate}}{8 \times \text{picture\_rate}} \right\}$$

$$T_b = \max\left\{ \frac{R}{N_b + \frac{N_p K_b X_p}{K_p X_b}}, \frac{\text{bit\_rate}}{8 \times \text{picture\_rate}} \right\}$$

In the Formula 2, $K_b$ and $K_p$ are constants dependent on a quantizing matrix, where $K_p = 1.0$, $K_b = 1.4$, and R is a bit number of the remaining allocated bits after encoding the previous picture. And, bit_rate is a channel transmission rate (bit/sec) and picture_rate is a number of pictures decoded per second. R (bit rate) is given as '0' when GOP initiates.

R becomes R+GOP_target every GOP, and then updated by a value found by subtracting bit amount generated every GOP from R.

In this case, G=bit_rate*N/picture_rate, N is a size of GOP, and $N_p$ and $N_b$ are numbers of P and B pictures respectively to be encoded in the present GOP.

The second step controls the transmission rate, i.e., bit rate, in which a reference quantizing parameter for each macro block is calculated in accordance with the fullness of the virtual buffer 40. And, the bit rate is adjusted so that each picture is encoded to be suitable for the bit allocated by the first step.

In this case, it is assumed that each picture has a random virtual buffer, and a method of adjusting the quantizing parameter in accordance with a status of the buffer.

The third step is an adaptive quantizing step. In the third step, activity of a macro block to be encoded currently is found to be normalized, and a quantizing parameter to be used substantially for the quantization is found by multiplying the reference quantizing parameter in the second step by the normalized activity. Namely, the adaptive quantization enables to increase a subjective image quality, in which the reference quantizing parameter is varied in accordance with the complexity of the current macro block.

Namely, the first and second steps, which calculate the bit allocation and the fullness of buffer, are performed through the buffer 40 and the reference quantizing parameter calculating unit 51, and the third step of carrying out the adaptive quantization is performed by an activity calculating unit 52 and a quantizing parameter generating unit 53.

In this case, the bit rate control unit 50 carries out effectively the bit allocation and bit rate control so as to attain the numbers and structures of the I-, P-, and B-pictures inside the GOP structure in the encoder 30.

A real-time video transcoder needs to encode the inputted bit stream immediately, whereby information of the currently encoded picture is acquired. Yet, the real-time video transcoder fails to recognize the GOP structure or picture_coding_type of the following picture. Hence, if the order or number of the P-pictures or the B-pictures is changed irregularly, it is difficult to control the bit rate of the encoder 30 so as to degrading a video quality.

Moreover, the video transcoder shown in FIG. 1 brings about a loss of the video quality in the process of making a transmission rate lower than the transmitted bit rate.

In order to save the video quality loss, used are methods such as 'bit amount reduction' removing a RF AC coefficient from an MPEG decoder, 'bit rate variance' changing a bit rate through re-quantization in an MPEG decoder, and 'cascaded transcoding' connecting simply MPEG decoder and encoder each other.

Yet, the 'bit amount reduction' removing a RF AC coefficient grasps a boundary between a bit length and a sign by parsing a bit column only so as to remove the DCT coefficient at an exceeding position by adjusting a target bit amount by macro block unit. Therefore, the 'bit amount reduction' has a simple structured hardware. But, the DCT coefficient is removed so as to generate a drift error. Hence, the 'bit amount reduction' degrades the video quality as well.

The method using re-quantization caries out inverse-quantization after VLD and applies a wider quantizing width to a quantization step again. Therefore, such a method has a video quality superior to that of the 'bit amount reduction', but increases a complexity of hardware.

And, the 'cascaded transcoding' is excellent in video quality, but the cascades transcoder has a built-in MPEG-2 encoder. Therefore, the 'cascaded transcoding' has a complicated hardware and carries out lots of calculation.

Namely, the storage device for high speed play or long time record in a digital VCR or the like has a relatively small record space, whereby considerable portions of data are cut from the received MPEG bit stream for record. Moreover, if a record time is extended twice longer in VCR record, a bit rate of the bit stream should be reduced to half. Home applications prefer a simple hardware degrading a quality to a complicated one costing much. Therefore, the home applications use the method of removing the RF AC coefficient or using re-quantization, or the like. Moreover, the cascaded transcoder removes the drift error through a motion compensation circuit so as to maintain a good video quality. Therefore, the 'cascades transcoding' is used for a VOD (video on demand) server, broadcasting station, or the like.

However, such a method requires massive calculation for determining new macro block determining mode, motion compensating mode, and the like.

SUMMARY OF THE INVENTION

Accordingly, the present invention is directed to a video transcoder that substantially obviates one or more problems due to limitations and disadvantages of the related art.

An object of the present invention is to provide a video transcoder transforming a HD (high definition) signal into an SD (standard definition) bit stream of low resolution by minimizing a loss of video quality.

Another object of the present invention is to provide video transcoder improving a video quality by measuring an amount of a bit stream decoded by a decoder and controlling a bit rate of an encoder using a result of the measurement.

A further object of the present invention is to provide video transcoder reducing a screen resolution using a down-conversion method in decoding a video signal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a video transcoding apparatus according to the present invention includes a video decoder receiving to decode a compressed video bit stream so as to restore a pixel value of an original scene, a video pre-processing unit having a predetermined matrix structure and down-sampling a macro block decoded by the video decoder by transforming the macro block into a corresponding picture structure to the compressed video bit stream, a frame memory storing the down-sampled macro block, a transcoding parameter control unit detecting information about a picture from a previous bit stream variable-length-decoded by the video decoder and setting up an encoding mode for a transcoding in accordance with the detected information, a video encoder encoding down-sampled data stored in the frame memory by macro block unit in accordance with the encoding mode outputted from the transcoding parameter control unit, and a bit rate control unit controlling quantization of the video encoder by calculating a bit amount encoded substantially by every picture among a bit stream to be decoded currently by the video decoder and finding a fullness of a buffer in the video encoder using the calculated bit amount.

Preferably, the video pre-processing unit carries out a down-sampling through a field based processing if the data decoded in the video decoder is an interlacing sequence and the macro block having a frame picture or through a frame based processing if the data decoded in the video decoder is a sequential scanning sequence or an interlacing sequence having a field picture structure so as to maintain information of field unit.

Preferably, the transcoding parameter control unit establishes a motion vector and a motion mode of the macro block down-sampled by the video pre-processing unit using a motion information of a previous bit stream variable-length-decoded by the video decoder.

Preferably, the transcoding parameter control unit establishes a following video encoding reference and then set up encoding parameters for a low resolution video of the video encoder based on the encoding reference: maintain a decoded picture coding type; maintain a decoded picture structure; maintain a decoded GOP (group of pictures); vary a decoded motion type or a macro block type; vary a decoded quantizing parameter; vary a decoded motion vector; and vary a decoded VBV_delay and a decoded VBV_buffer_size.

More preferably, the transcoding parameter control unit controls the video encoder so as to intra-code macro blocks outputted from the frame memory if a currently-decoded picture coding type outputted from the video decoder is an I picture.

More preferably, the transcoding parameter control unit determines whether to carry out a motion compensation through types of previously-decoded macro blocks corresponding to the macro block to be encoded currently if the currently-decoded picture coding type outputted from the video decoder is a P or B picture.

More preferably, the transcoding parameter control unit controls the video encoder so as to intra-code the macro block to be encoded currently if at least three intra macro blocks exist in the previously-decoded four macro blocks corresponding to the macro block to be encoded currently.

More preferably, the transcoding parameter control unit controls the video encoder so as to intra-code the macro block to be encoded currently if two macro blocks in a diagonal direction among four previously-decoded macro blocks corresponding to the macro block to be encoded currently are at intra mode.

More preferably, the transcoding control unit judges that a motion compensation is necessary if none of previously-decoded macro blocks corresponding to the macro block to be encoded currently is an intra macro block, and then distinguishes the P and B pictures from each other with the picture coding type.

More preferably, average and median values of motion vectors of the previously-decoded macro blocks corresponding to the macro block to be encoded currently are found for the P picture and then the motion vector having a less mean absolute error (MAE) found from two vectors defined by the average value and median value respectively is selected as a motion compensating vector.

More preferably, the video encoder encodes the macro block to be encoded currently as the intra mode if the selected MAE is over a predetermined value, and wherein the video encoder carries out the motion compensation by setting up the macro block type and the motion type fitting for the P picture if the selected MAE is less than the predetermined value and then encodes a difference between the motion-compensated macro block and the macro block to be encoded currently.

More preferably, average and median values of forward and backward motion vectors of the previously-decoded macro blocks corresponding to the macro block to be encoded currently are found for the B picture and then a motion vector at a least one of mean absolute errors (MAE) found from four vectors defined by the average and mean values is selected as a motion compensating vector.

More preferably, the video encoder encodes the macro block to be encoded currently as the intra mode if the selected MAE is over a predetermined value, and wherein the video encoder carries out the motion compensation by setting up the macro block type and the motion type fitting for the B picture if the selected MAE is less than the predetermined value and then encodes a difference between the motion-compensated macro block and the macro block to be encoded currently.

Preferably, the bit rate control unit includes a picture bit counting unit calculating a bit amount encoded substantially for each picture in a video bit stream which is inputted to the video decoder and to be encoded currently, a buffer in the video encoder finding a target bit number for a picture to be encoded using the bit amount calculated by the picture bit counting unit and a video bit stream variable-length-coded in the video encoder and then calculating the fullness of the buffer in the video encoder using the found target bit number, a reference quantizing parameter calculating unit calculating a reference quantizing parameter in accordance with the buffer fullness outputted from the buffer, an activity calculating unit producing an activity of a video outputted from the video decoder, and a quantizing parameter generating unit generating a quantizing parameter to be used for a substantial quantization in accordance with the calculated reference quantizing parameter and the calculated activity so as to control a quantization of the video encoder.

More preferably, the picture bit counting unit detects a picture start code picture_start_code in the video stream inputted to the video decoder and counts to output a bit number between the detected picture start code and a next picture start code.

More preferably, the activity calculating unit receives an output of the frame memory, finds the activity of the macro block to be encoded currently, normalizes the activity, and outputs the normalized activity to the quantizing parameter generating unit, and wherein an initial value of an average value of the activities used for the activity normalization is set up by finding an average activity of a macro block to be decoded into an original resolution.

In another aspect of the present invention, a video transcoding apparatus includes a video decoder receiving to decode a compressed video bit stream through variable length decoding, inverse quantization, inverse DCT, and motion compensation processes, carrying out a down-sampling for a conversion to a different bit rate to output a down-sampled video, carrying out an up-sampling on the down-sampled video, and carrying out a motion compensation on the up-sampled video, a frame memory storing the down-sampled macro block, a transcoding parameter control unit detecting information about a picture from a previous bit stream variable-length-decoded by the video decoder and setting up an encoding mode for a transcoding in accordance with the detected information, a video encoder encoding down-sampled data stored in the frame memory by macro block unit in accordance with the encoding mode outputted from the transcoding parameter control unit, and a bit rate control unit controlling quantization of the video encoder by calculating a bit amount encoded substantially by every picture among a bit stream to be decoded currently by the video decoder and finding a fullness of a buffer in the video encoder using the calculated bit amount.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

The present invention is characterized in that an MPEG-2 bit stream transmitted at a high speed transport bit rate (over about 10 Mbps) is converted into the MPEG-2 bit stream having a low transport bit rate (below about 6 Mbps), and described by first and second embodiments using a technique of reducing a memory size.

First Embodiment

Figure 2:
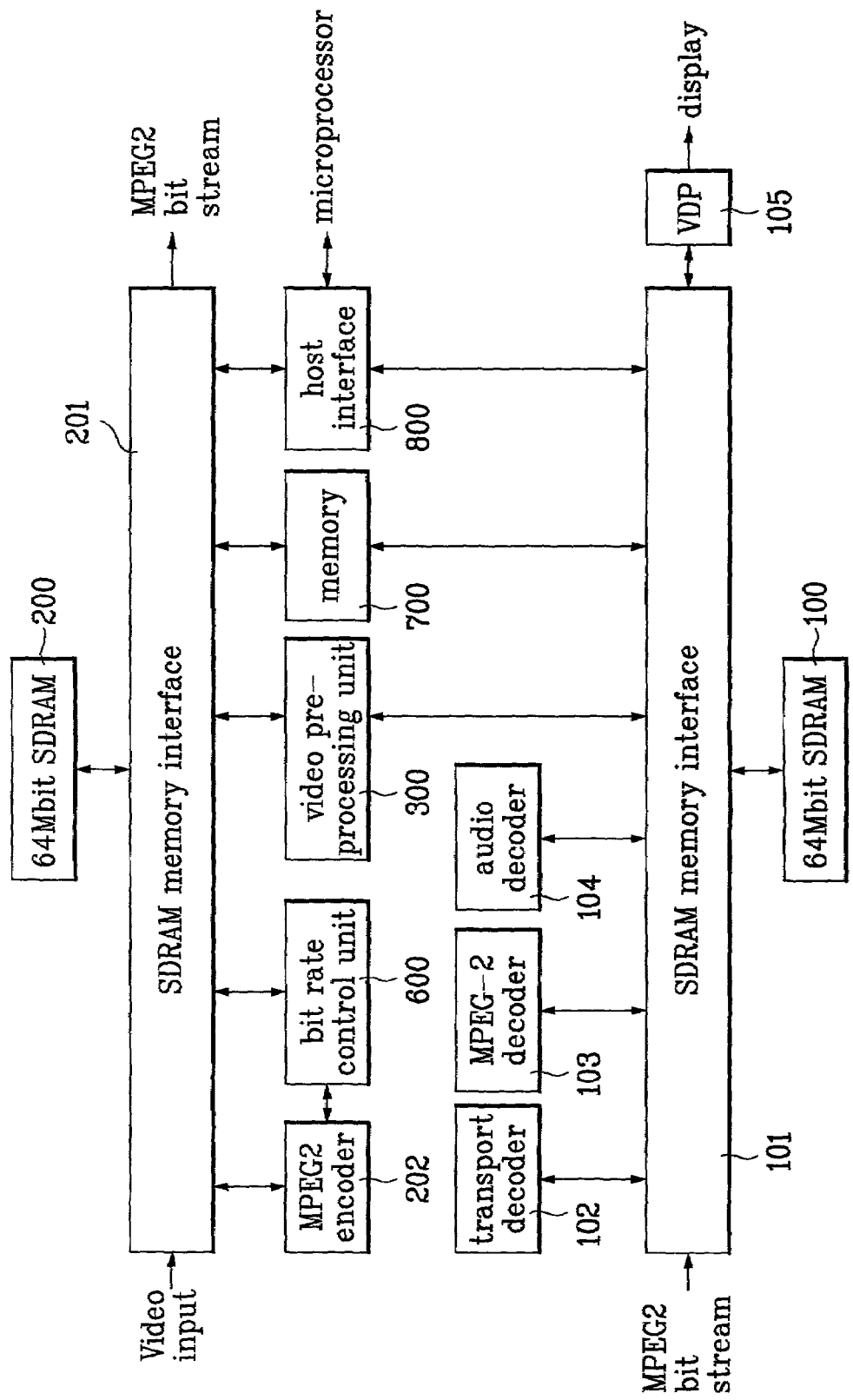
FIG. 2 illustrates a block diagram of a video transcoder according to a first embodiment of the present invention.

FIG. 2 illustrates a block diagram of a video transcoder according to a first embodiment of the present invention.

Referring to FIG. 2, a video transcoder according to a first embodiment of the present invention carries out a video decoding and a video encoding simultaneously through a couple of memories 100 and 200 and a couple of independent memory interface units 101 and 201. Besides, a DMA (direct memory access) unit 700 is arranged between the memory interface units 101 and 201 for data transmission between the memories 100 and 200 so as to receive MPEG-2 TS (transport stream), packet element stream (PES), and element stream (ES). In this case, the memories are DRAMs or synchronous DRAMs (SDRAM). The present invention uses SDRAMs for the embodiment of the present invention.

Moreover, the transported MPEG-2 video and audio bit stream is multiplexed. Hence, the transported MPEG-2 video and audio bit stream is divided into an MPEG-2 video bit stream and an MPEG-2 audio bit stream in a transport decoder 102.

The divided video and audio bit streams are decoded in an MPEG-2 video decoder 103 and an audio decoder so as to be outputted to a screen and a speaker, respectively. In this case, a video is displayed on a screen through a VDP (video display processor) 105.

A frame decoded in a video sequence of HD rate or high transport bit rate is reduced to a normal degree of resolution, i.e., a low resolution of SD or NTSC rate, through a video pre-processing unit 300, whereby a memory size is reduced about ¼. Therefore, a video encoder 202 enables to decrease a memory bandwidth and a processing time greatly.

Consequently, the high transport rate is reduced to a low transport bit rate so as to increase a capacity of a storage device such as a video recorder or the like. And, encoding parameters of the reduced resolution are readjusted to be suitable for the low transport bit rate through the MPEG-2 video encoder 202 so as to maintain a video quality. This is because the encoding parameters suitable for the transport bit rate of high resolution fail to be optimal in low resolution.

Moreover, the present invention uses the currently-decoded parameters among various parameters of a video encoding for the MPEG-2 video encoder 202, whereby a time taken to calculate the parameters and a hardware complexity in the MPEG-2 video encoder 202 are reduced. Besides, it is not necessary to perform a motion estimation during the motion compensation in the video encoder 202, thereby making a motion compensating fast.

Figure 1:
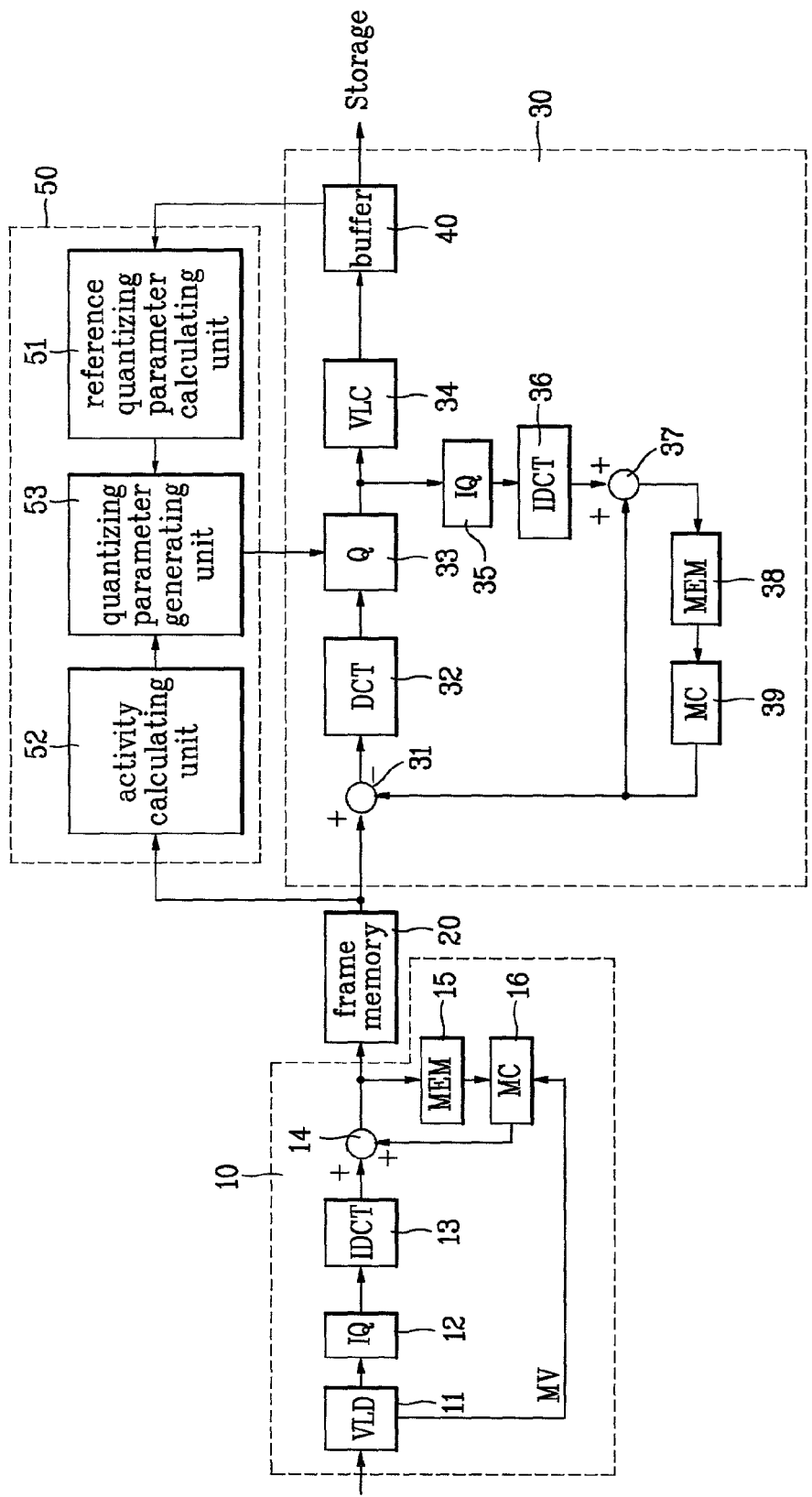
FIG. 1 illustrates a block diagram of a general video transcoder.
Figure 3:
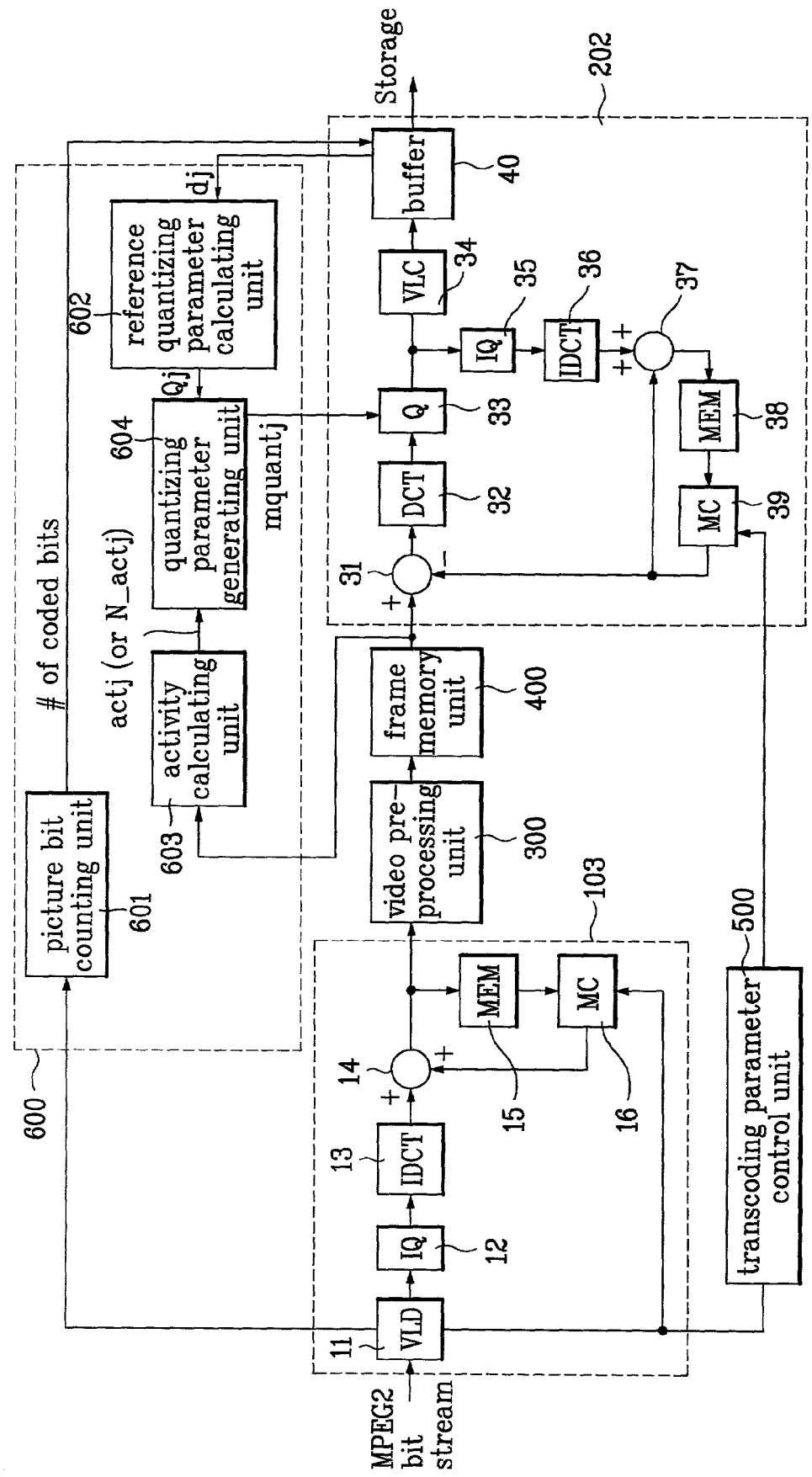
FIG. 3 illustrates a detailed block diagram for FIG. 2.

FIG. 3 illustrates a detailed block diagram of the video transcoding unit for FIG. 2, in which video decoder 103 and video encoder 202 have the same construction in FIG. 1.

Referring to FIG. 3, a video pre-processing unit 300 and a transcoding parameter control unit 500 are added to FIG. 1. An external memory 15 in FIG. 3 is the same of the SDRAM 100 in FIG. 2, and another external memory 38 in FIG. 3 is the same of the SDRAM 200 in FIG. 2. These devices differ just in numeral expressions. For the convenience of explanation, the present invention uses the external memories 15 and 38.

Moreover, a bit rate control unit 600, which improves the first step carrying out a target bit allocation, controls a generating amount of data by calculating a bit amount encoded substantially in every picture of an MPEG-2 bit stream to be encoded currently and varying a step size of a quantizing unit 33 using a result of the calculation.

In this case, the video pre-processing unit 300 may receive an MPEG-2 bit stream, which is video-decoded in the video decoder 103, of high transport bit rate or a digital video signal of SD rate from outside.

Namely, a bit stream parsed through the VLD unit 11 of the video decoder 103 passes through the IQ unit 12, IDCT unit 13, adder 14, and motion compensating unit 16 so as to be stored in the external memory 15. In this case, a general MPEG-2 video decoder 103 carries out IDCT by 8*8 block unit so as to be fit for the MPEG-2 video syntax. For an I-picture, a result of IQ/IDCT is directly stored in the external memory 15. For a P or B-picture, a motion-compensated block and the IDCT result are added together in the adder 14 so as to be stored in the external memory 15.

And, a video stored in the external memory 15 is displayed on a screen through the VDP 105.

In order to reduce a memory bandwidth, macro blocks decoded from the video decoder 103 are outputted to the video pre-processing unit 300 so as to reduce a degree of resolution up to ¼.

Figure 4:
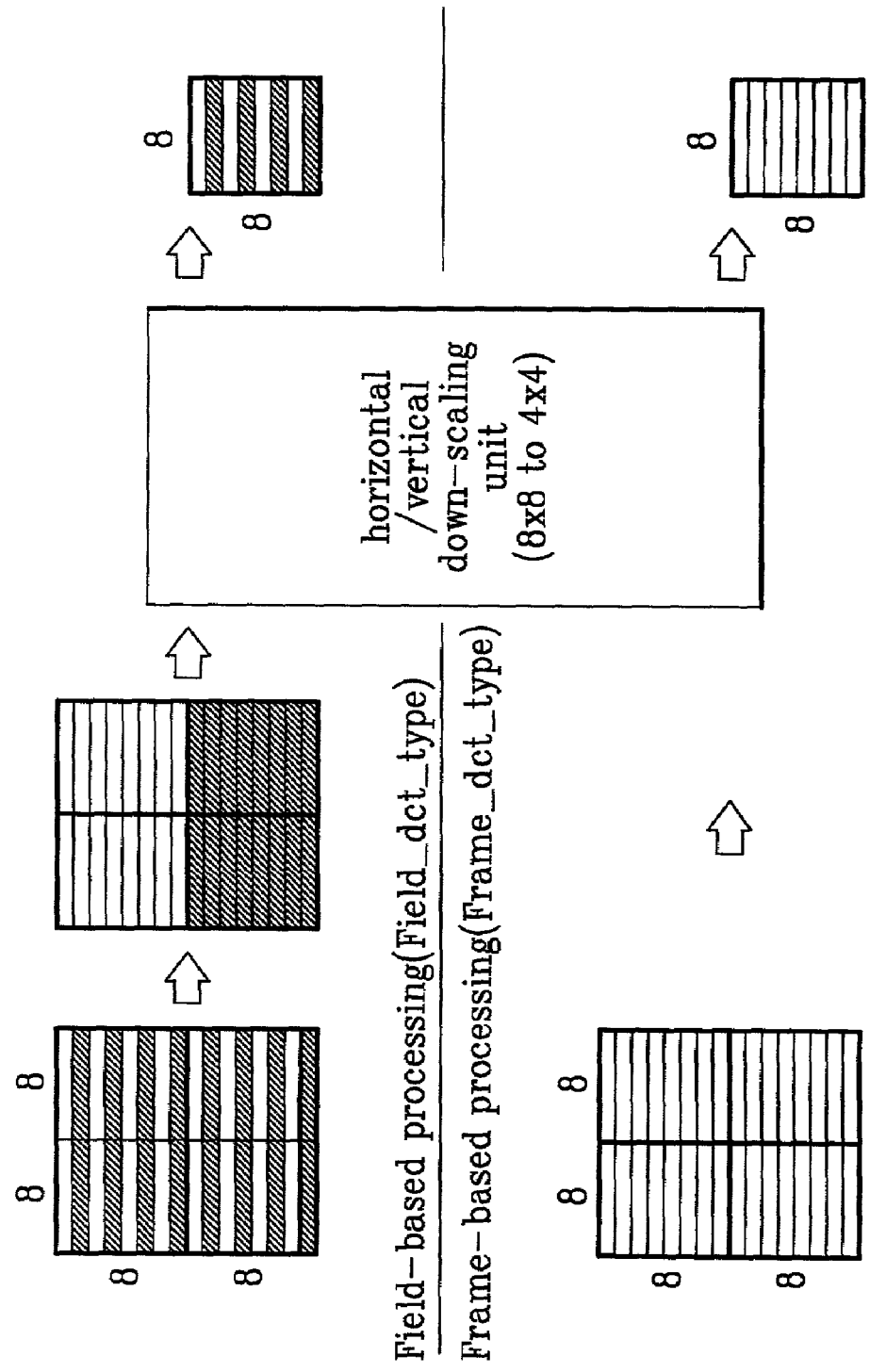
FIG. 4 illustrates a diagram of transforming an HD macro block into SD sub-blocks in a video pre-processing unit according to the present invention.

FIG. 4 illustrates a detailed diagram of operating the video pre-processing unit 300 having a downscaling algorithm for memory reduction.

Namely, the conventional MPEG-2 video decoder performs the motion compensation by reading pixels by frame or field unit from a memory in accordance with a frame or field picture. Yet, when a down-sampling is carried out in a vertical direction for 75% reduction, a down-sampled result of the frame picture is different from that of the field picture. Hence, the frame and field pictures existing in one sequence fail to provide uniform down-sampling results.

In order to improve such a problem, the present invention, as shown in an upper part of FIG. 4, down-samples a macro block, which has the frame picture and is an interlacing sequence, through a field-based processing, whereby the result shows that top/bottom fields coexist. On the contrary, the frame-based processing, as shown in a lower part of FIG. 4, is carried out on a sequential scanning sequence or an interlacing sequence of a field picture structure that has only the information corresponding to the same field in one macro block.

Accordingly, the information about the field is not lost even if the frame picture is down-sampled in a vertical direction. Thus, excellent video quality is maintained. As a result, the case of the interlacing sequence enables to maintain the information of field unit continuously.

The following Formula 3 expresses a relation used for down-sampling the video pre-processing unit 300.

$$[X] = \begin{bmatrix} x0 \\ x1 \\ x2 \\ x3 \\ x4 \\ x5 \\ x6 \\ x7 \end{bmatrix} = [T8][x], \quad \text{[Formula 3]}$$

where [X] represent 8 frame coefficients and [x] denotes 8 pixel values.

In this case, the following Formula 4 expresses an 8×8 DCT based matrix [T8].

$$[T8] = \begin{bmatrix} t_{00} & t_{01} & t_{02} & t_{03} & t_{04} & t_{05} & t_{06} & t_{07} \\ t_{10} & t_{11} & t_{12} & t_{13} & t_{14} & t_{15} & t_{16} & t_{17} \\ t_{20} & t_{21} & t_{22} & t_{23} & t_{24} & t_{25} & t_{26} & t_{27} \\ t_{30} & t_{31} & t_{32} & t_{33} & t_{34} & t_{35} & t_{36} & t_{37} \\ t_{40} & t_{41} & t_{42} & t_{43} & t_{44} & t_{45} & t_{46} & t_{47} \\ t_{50} & t_{51} & t_{52} & t_{53} & t_{54} & t_{55} & t_{56} & t_{57} \\ t_{60} & t_{61} & t_{62} & t_{63} & t_{64} & t_{65} & t_{66} & t_{67} \end{bmatrix}, \quad \text{[Formula 4]}$$

where [T8] denotes the 8×8 DCT matrix consisting of 8-pont DCT bases.

And, lets assume that [T4] is 4*4 DCT matrix comprising 4-point bases similar to that in Formula 4. Then, the following Formula 5 denotes a down-sampling process of removing RF number components in horizontal/vertical directions and carrying out IDCT.

$$\begin{bmatrix} y \\ y \\ y \\ y \\ 0 \\ 0 \\ 0 \\ 0 \end{bmatrix} = [P4^T] = \begin{bmatrix} X0 \\ X1 \\ X2 \\ X3 \\ X4 \\ X5 \\ X6 \\ X7 \end{bmatrix} \quad \text{[Formula 5]}$$

The following Formula 6 denotes [P4].

$$[P4] = \begin{bmatrix} T4 & 0 \\ 0 & 0 \end{bmatrix} \Big/ \sqrt{2} \quad \text{[Formula 6]}$$

Consequently, the following Formula 7 expresses the 1-dimensional downscaling process using Formula 4 and Formula 5.

$$y_{[4 \times 1]} = C_4^T \cdot X_{[8 \times 1]} = [T4^T 0]/\sqrt{2} \cdot [T8] \cdot x_{[8 \times 1]}, \quad \text{[Formula 7]}$$

where x represents 8×1 pixels, y denotes down-sampled 4×1 pixels, and X is a DCT coefficient block for x. T8 is a 8×8 DCT based matrix, $$C_4 = \begin{bmatrix} T4 \\ 0 \end{bmatrix} \Big/ \sqrt{2},$$

and $C_4$ is a 4×4 DCT based matrix.

Accordingly, the following Formula 8 expresses a down-scaling transformation from pixel to pixel unit using Formula 7.

$$y_{[4 \times 1]} = C_{4 \times 8} \cdot x_{[8 \times 1]}, \quad \text{[Formula 9]}$$

where $C_{4 \times 8} C_4^T \cdot T8$ defines 4×8-dimensional down-sampling matrix and converts 8 pixels into 4 pixels.

In this case, the following Formula 9 expresses a down-sampling matrix having an input of 4 pixels and an output of 2 pixels, which is similar to Formula 8, in case of a chrominance signal.

$$y_{2 \times 1} = C_{2 \times 4} \cdot x_{[4 \times 1]}, \quad \text{[Formula 9]}$$

where $C_{2 \times 4} = [T2\ 0]^T \cdot T4\sqrt{2}$ and T2 is a 2*2 DCT based matrix as in Formula 4.

Moreover, in order to maintain the information about the field in the memory for 75% memory reduction, luminance and chrominance signals are separated from each other so as to be processed. In this case, the chrominance signal is divided into 4*8-sized top/bottom fields for the frame picture, while the luminance signal is divided into 8*8-sized top/bottom fields. As the number of lines in the vertical field of the chrominance signal becomes a half of the luminance signal, a down conversion is carried out using Formula 9. And, the down conversion is carried out using Formula 9 for the luminance signal.

The video pre-processing unit 300 carries out the above down-sampling processes so as to reduce the resolution to ¼. Therefore, the originally-decoded 16*16-sized macro block is naturally converted into 8*8-sized sub-blocks. Thus, the macro block in the MPEG-2 encoder 202 comes from the 4 originally-decoded macro blocks by mergence. In this case, it is important to use the previously decoded parameters in order to reduce the processing time or complexity of hardware.

Accordingly, the present invention regulates the following reference for a video encoding of the video encoder 202.

1. maintain a decoded picture coding type
2. maintain a decoded picture structure
3. maintain a decoded GOP (group of pictures)
4. vary a decoded motion type or a macro block type
5. vary a decoded quantizing parameter
6. vary a decoded motion vector
7. vary a decoded VBV_delay and a decoded VBV_buffer_size The previous parameters are maintained or readjusted with the above regulations, thereby enabling to realize a video converter of excellent performance.

Namely, the transcoding parameter control unit 500 in FIG. 3 defines the encoding parameters for a video of low resolution based on the above encoding regulations.

Figure 5:
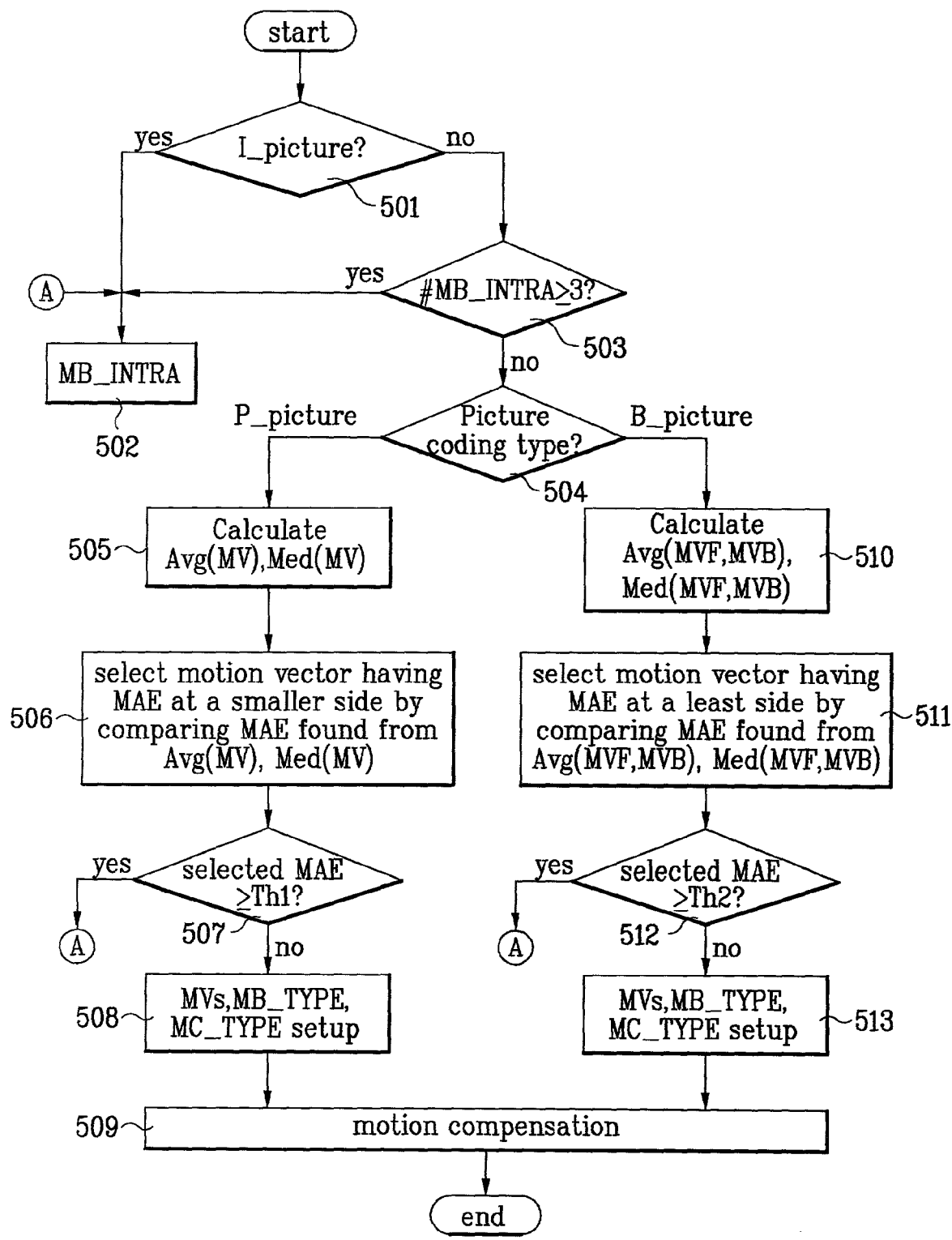
FIG. 5 illustrates an operational flowchart of a video encoding unit in FIG. 2.

An operation flowchart for the above procedure is shown in FIG. 5. FIG. 5 illustrates an operational flowchart of a video encoding unit in FIG. 2.

Referring to FIG. 5, it is judged whether a currently decoded picture type which is outputted from the video decoder 103 is an I picture (step 501). If it is judged that the currently decoded picture type is the I picture by the step 501, all macro blocks are intra-coded (step 502).

If it is judged that the currently decoded picture type is not the I picture, i.e., that the currently decoded picture type is an P or B picture, by the step 501, it is determined whether the motion compensation is performed through a type of the previously decoded macro block corresponding to the currently macro block to be encoded.

Figures 6A, 6B:
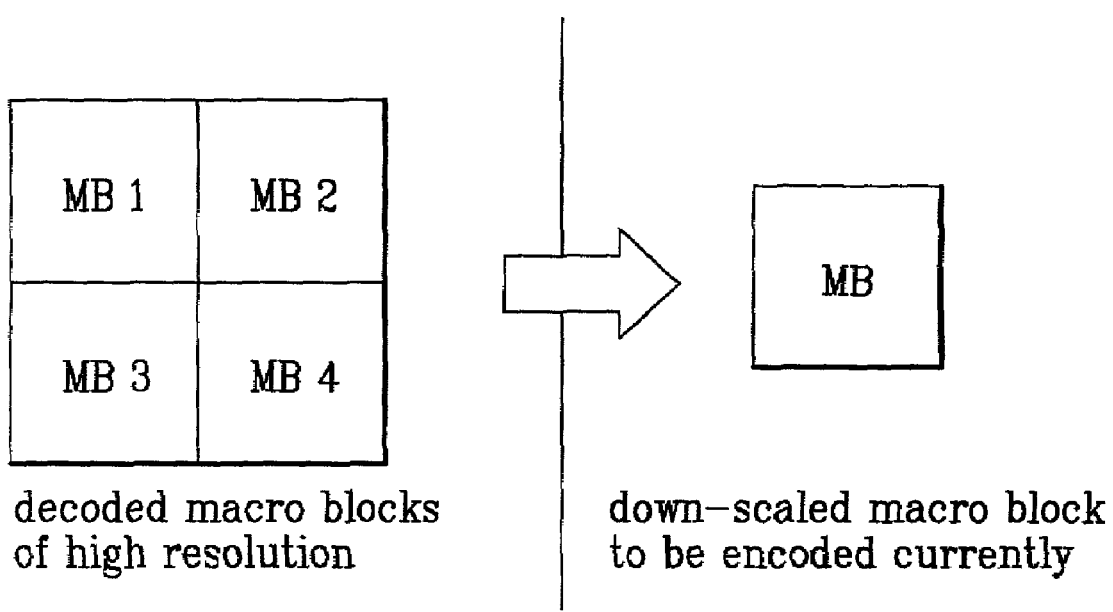
FIG. 6A and FIG. 6B illustrate diagrams for determining macro block types.

Namely, the transcoding parameter control unit 500 determines whether to perform the intra-coding or motion compensation from the type of the previously decoded macro block corresponding to the currently macro block to be encoded in accordance with a table shown in FIG. 6B.

If at least one of four previously-decoded macro blocks MB1 to MB4 corresponding to the currently macro block to be encoded is an intra macro block in FIG. 6A and FIG. 6B, the intra-coding is carried out (step 502).

When the number of the intra macro blocks among the four previously-decoded macro blocks MB1 to MB4 corresponding to the macro blocks to be encoded currently is at least 3, the macro blocks to be encoded currently are intra-coded. This is because there are lots of motions in a scene or a probability of representing scene transition is high.

Specifically, when the MB1 and MB4 among the four previously-decoded macro blocks MB1 to MB4 corresponding to the macro block to be encoded currently are at the intra mode or the MB2 and MB3 are at the intra mode, the macro block to be encoded currently is intra-coded. This case has a high probability of irregular motions or different motions in a scene, thereby having difficulty in motion compensation.

The rest of cases are determined as the macro blocks having motions, and then proceeds to a step 504 so as to carry out the motion compensation. For instance, if there is no intra macro block in at least one of the four previously-decoded macro blocks MB1 to MB4 corresponding to the macro block to be encoded currently, the motion compensation is carried out by proceeding to the step 504.

The step 504 judges whether it is the P or B picture by checking a picture coding type. Namely, if is judged that the motion compensation is necessary by the step 503, the P or B picture is distinguished from the picture coding type in the step 504 and then the motion compensation is carried out on the P and B pictures separately.

Figure 7:
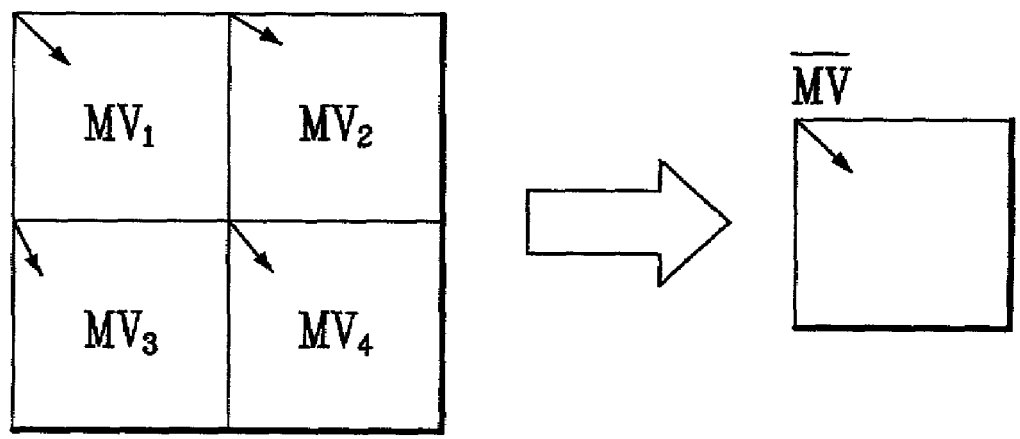
FIG. 7 illustrates a diagram of selecting a motion vector adaptively in motion compensation.

If it is the P picture, there exists a forward motion vector only. Hence, average and median values of motion vectors of the four macro blocks, as shown in FIG. 7, are found (step 505). Formula 10 and Formula 11 express the methods of finding the average and median values $\overline{MV}$ and Med(MV), respectively.

$$\overline{MV} = \frac{\sum_{i=1}^{4} MV_i \cdot A_i}{\sum_{i=1}^{4} A_i}, \text{ where } A_i = \begin{cases} 1, & \text{non-intra} \\ 0, & \text{intra} \end{cases} \quad \text{[Formula 10]}$$

$$\text{Med}(MV) = \text{media}(MV_i, I=1, \ldots, 4) \quad \text{[Formula 10]}$$

And, absolute average errors MAE attained from two vectors in Formula 10 and Formula 11 are compared to each other, and then the motion vector having the MAE smaller than the other is selected as a motion compensating vector MVs (step 506). In this case, if it is judged that the MAE selected in the step 506 is higher than or equal to a predetermined value Th1, it is decided as the intra mode so as to proceed back to the step 502 (step 507).

Meanwhile, if it is judged that the MAE selected in the step 506 is lower than the predetermined value Th1, a macro block type MB_TYPE and a motion type MC_type and the like are selected (step 508).

In this case, the motion type MC_TYPE in the frame picture is divided into a frame unit motion compensation MC_FRAME and field unit motion compensations MC_FIELD and MC_DMV. As the MC_FRAME may be regarded as the motion vectors such as top and bottom fields, thereby being processed as motion vectors for fields by Formula 10 and Formula 11. If all the motion types MC_TYPE are MC_FRAME, the motion type of the macro block to be encoded currently is defined as MC_FRAME. If there exists at least one motion type MC_TYPE in the MC_FIELD, it is processed as MC_FIELD.

The above explanation is summarized in the following table 1.

Meanwhile, forward and backward motion vectors coexist in the B picture. If it is judged as the B picture in the step 504, average and media values of the motion vectors for the two cases, as shown in FIG. 5, are found through the following Formulas 12 to Formulas 15 (step 510).

$$\overline{MVF} = \frac{\sum_{i=1}^{4} MVF_i \cdot A_i}{\sum_{i=1}^{4} A_i}, \quad \text{[Formula 12]}$$

$$\text{where } A_i = \begin{cases} 1, & \text{non-intra and forward } MV \\ 0, & \text{otherwise} \end{cases}$$

$$\overline{MVB} = \frac{\sum_{i=1}^{4} MVB_i \cdot A_i}{\sum_{i=1}^{4} A_i}, \quad \text{[Formula 13]}$$

$$\text{where } A_i = \begin{cases} 1, & \text{non-intra and backward } MV \\ 0, & \text{otherwise} \end{cases}$$

$$\text{Med}(MVF) = \text{median}(MVF_i, I=1, \ldots, 4) \quad \text{[Formula 14]}$$

$$\text{Med}(MVB) = \text{median}(MVB_i, I=1, \ldots, 4) \quad \text{[Formula 15]}$$

After MAE has been found from the respective motion vectors in Formulas 12 to Formulas 15, the motion vector having the least MAE is selected as a motion compensating vector MVs (step 511). Moreover, after determining the corresponding macro block type MB_TYPE and motion type MC_TYPE (step 513), the motion compensation is carried out on the B picture using the determined parameters (step 509). In this case, the step 512 judges whether the selected MAE is equal to or higher than a predetermined value Th2. If it is equal to or higher than the predetermined value Th2, it is determined as the intra mode so as to proceed to the step 502. If it is lower than the predetermined value Th2, the process proceeds to the step 513 so as to determine the macro block type MB_TYPE, the motion type MC_TYPE and the like.

Operation of the video encoder in FIG. 3 is explained as follows. For the intra picture, a result through the IDCT unit

TABLE 1

| MB1 | MB2 | MB3 | MB4 | Result |
|---|---|---|---|---|
| MC_FRAME | MC_FRAME | MC_FRAME | MC_FRAME | MC_FRAME |
| MC_FIELD | MC_FIELD | MC_FIELD | MC_FIELD | MC_FIELD |

Set up as MCFIELD if MC_FIELD exists in at least one macro block of blocks MB1 to MB4

In this case, MC_FIELD has motions of a top block motion vector and a bottom block motion vector. Hence, if MC_FIELD exists in at least one macro block of blocks MB1 to MB4, one MV of the MC_FRAME is allocated to the top and bottom blocks equally.

As is the same of the above case, the filed picture motion type MC_TYPE is divided into MC_FIELD, MC_16*8, and MC_DMV. If at least one MC_16*8 exists, the motion type is determined as MC_16*8.

The motion compensation is then carried out on the P picture using the above-described parameters (step 509).

13 is instantly down-sampled in the video pre-processing unit 300, passes again through the frame memory 400, DCT unit 32 of the video encoder 202, and quantizing unit 33, and then outputted to the VLC unit 34. In this case, each of the macro blocks is intra-coded, and the bit rate control unit 600 controls the quantizing parameters.

If the P or B picture is judged as the intra mode, the above process of the intra picture is carried out as it is. If it fails to be judged as the intra mode, a predictive motion compensation is carried out on a video of low resolution which is newly quantized. Namely, as mentioned in the foregoing explanation, the predictive motion compensation is carried out as a frame prediction and a field prediction in accordance with the motion types MC_TYPE. A difference between the predictively compensated video and the currently down-sampled video of low resolution is found by the adder 31. The found difference is encoded through the DCT unit 32, quantizing unit 33, and VLC unit 34, and then stored in the buffer 40.

Meanwhile, the bit rate control unit 600 includes a picture bit counting unit 601 calculating an amount of bits encoded substantially for each picture in an MPEG-2 bit stream to be encoded currently, a reference quantizing parameter calculating unit 602 calculating a reference quantizing parameter in accordance with a buffer fullness outputted from the buffer 40, an activity calculating unit 603 producing an activity of a video outputted from the frame memory unit 300, and a quantizing parameter generating unit 604 generating a quantizing parameter to be used for a substantial quantization in accordance with the calculated reference quantizing parameter and the calculated activity so as to output the quantizing parameter to the quantizing unit of the encoder 400.

The present invention explains just the bit rate control unit 600 and the calculation of the fullness of the buffer 400.

First, the buffer 40 finds a target bit number for a picture to be encoded in the encoding unit 400 using the bit amount calculated by the picture bit counting unit 601, calculates the buffer fullness using the found target bit number, and outputs the buffer fullness to the reference parameter calculating unit 602 of the bit rate control unit 600.

Namely, it is important to adjust a quantizing coefficient of the quantizing unit 33 for video quality. Therefore, the present invention controls the bit rate control and the quantization using the picture bit counting unit 601.

For this, the picture bit counting unit 601 has a function of detecting picture_start_code in the currently-inputted video stream and another function of counting bits between the picture_start_code and the next picture_start_code. The bit number counted by the picture bit counting unit 601 becomes the bit number $T_1 \approx T_{1i}$, $T_{1p}$, and $T_{1b}$ resulted from encoding one picture of a high resolution video.

The buffer 40 then enables to predict the target bit number of one picture to encode a low resolution video using the bit number $T_1$ and the following Formulas 16 to Formulas 18.

$$T_1 = c \cdot R_1 \qquad \text{[Formula 16]}$$

$$T_2 = c \cdot R_2 \qquad \text{[Formula 17]}$$

$$T_2 = T_1 \cdot \frac{R_2}{R_1}, \qquad \text{[Formula 18]}$$

where $T_1$ and $R_1$ denote the target bit number of one picture of a transported video stream and a bit rate of one sequence, respectively. $T_2$ and $R_2$ represent a target bit number of one picture of a video stream to be transcoded and a bit rate of one sequence thereof, respectively. And, c is a proportional constant resulted from the complexity and number of I, P, and B pictures remaining in GOP.

In this case, assuming that there is less difference between the complexities of the low resolution video and the complexity of the high resolution video, Formula 18 is resulted from Formula 16 and Formula 17.

$R_1$ is easily found from syntax of MPEG bit stream, and $R_2$ is the bit rate to be retransmitted. As $T_1$ is detected by the picture bit counting unit 601, it is easy to find the target bit number $T_2$ of the picture to be encoded currently. Thus, a portion of allocating the target bit number is removed from the conventional bit rate control system, thereby enabling to reduce hardware.

Three steps of controlling the bit rate and quantization using the found $T_2$ are explained in detail as follows.

Step 1) Bit Allocation

First, the buffer 40 finds the target bit number for a

[Formula 19]

$$T_2(k) = T_1(k) \times \frac{R_2}{R_1}, \text{ where } k \in \{i, p, b\}. \qquad \text{[Formula 19]}$$

Formula 19 is resulted from normalizing Formula 18. $T_1(k)$ is the target bit number to allocate k-picture to GOP, and is found in the picture bit counting unit 601.

Step 2) Rate Control

Step 2 adjusts a transport rate, i.e., a bit rate. In the step 2, the bit rate is controlled to encode a current picture so that each picture fits for the target bit number found in the step 1.

For this, in the following Formula 20, the buffer 40 seeks a fullness of each buffer before a macro block j is encoded using the target bit number $T_2$ found by the step 1.

$$d_j^i = d_0^i + B_{j-1} - \left\{ \frac{T_{2i} \times (j-1)}{MB\_cnt} \right\} \qquad \text{[Formula 20]}$$

$$d_j^p = d_0^p + B_{j-1} - \left\{ \frac{T_{2p} \times (j-1)}{MB\_cnt} \right\}$$

$$d_j^b = d_0^b + B_{j-1} - \left\{ \frac{T_{2b} \times (j-1)}{MB\_cnt} \right\},$$

where each of $d_0^i, d_0^p, d_0^b$ shows an initial fullness of the virtual buffer 40.

The initial fullness is a bit rate control error in the most previous picture of the same type. Namely, the bit rate control error is a difference between the bit number generating from encoding the previous picture of the same type and the other bit number allocated to the corresponding picture. $B_j$ is a bit number generated from encoding macro blocks up to the present including j. MB_cnt represents total number of the macro blocks in the picture. $d_0^i, d_0^p, d_0^b$ shows an initial fullness of the virtual buffer 40 of the corresponding picture. The fullness $d_0^i, d_0^p, d_0^b$: j=MB_cnt of the last virtual buffer 40 is used for the initial fullness $d_0^i, d_0^p, d_0^b$ of the next picture.

The above-found fullness $d_j$ of the buffer is outputted to the reference quantizing parameter calculating unit 602 of the bit rate control unit 600.

The reference quantizing parameter calculating unit 602 seeks a reference parameter $Q_j$ of the jth macro block by the following Formula 21 using the generated fullness of the buffer 40 from an encoding up to the (j−1)th macro block, and then outputs the reference parameter $Q_j$ to the quantizing parameter generating unit 604.

$$Q_j = \left( \frac{d_j \times 31}{r} \right) \qquad \text{[Formula 21]}$$

In this case, a reaction parameter r in Formula 21 is found by the following Formula 22.

$$r = 2 \times \frac{R_2}{\text{picture\_rate}} \quad \text{[Formula 22]}$$

Step 3) Adaptive Quantization

The adaptive quantization is a method enabling to increase a subjective video quality, and varies the reference quantizing parameter in accordance with a complexity of the current macro block.

For this, the activity calculating unit 603 receives an output of the frame memory unit 300 so as to find an activity $act_j$ of the macro block to be encoded currently, calculates an activity $N\_act_j$ normalized from the activity $act_j$, and outputs the normalized activity to the quantizing parameter generating unit 604. In this case, the $act_j$ is used as is represented by a minimum value of variances of the respective sub-blocks in the macro block.

A normalization of $act_j$ representing the complexity of each macro block is carried out by the following Formula 23.

$$N\_act_j = \frac{(2 \times act_j) + \text{avg\_act}}{act_j + (2 \times \text{avg\_act})} \quad \text{[Formula 23]}$$

In this case, avg_act is an average value of activities $act_j$ of the lately encoded picture. Generally, it is defined as avg_act=400 in the first picture. Yet, the present invention seeks avg_act of a first-decoded macro block of original resolution and sets up the sought avg_act as an initial value. Therefore, the present invention provides a better video quality.

A flat portion sensitive for human eyes has $act_j$ lower than an overall average complexity avg_act of the current picture, thereby having a smaller $N\_act_j$. On the contrary, a portion less sensitive to human eyes has $act_j$ higher than the average complexity, thereby having a larger $N\_act_j$.

The quantizing parameter generating unit 604 multiplies the normalized activity $N\_act_j$ by the reference quantizing parameter $Q_j$ like the following Formula 24, thereby finding a quantizing parameter $mquant_j$ of a macro block to be substantially used for quantization.

$$mquant_j = Q_j * N\_act_j, \quad \text{[Formula 24]}$$

where a value of $mquant_j$ lies within a range of [1, ..., 31] and is coding-transported by macro block unit.

Accordingly, the present invention uses the picture bit counting unit 601, thereby enabling to simplify the bit allocation in the step 1 as well as improve a video quality by using the bit allocation information of the encoder 400 effectively. Moreover, the present invention needs no information about a GOP structure, thereby enabling to carry out the bit allocation and quantization on the current picture instantly.

Second Embodiment

Figure 8:
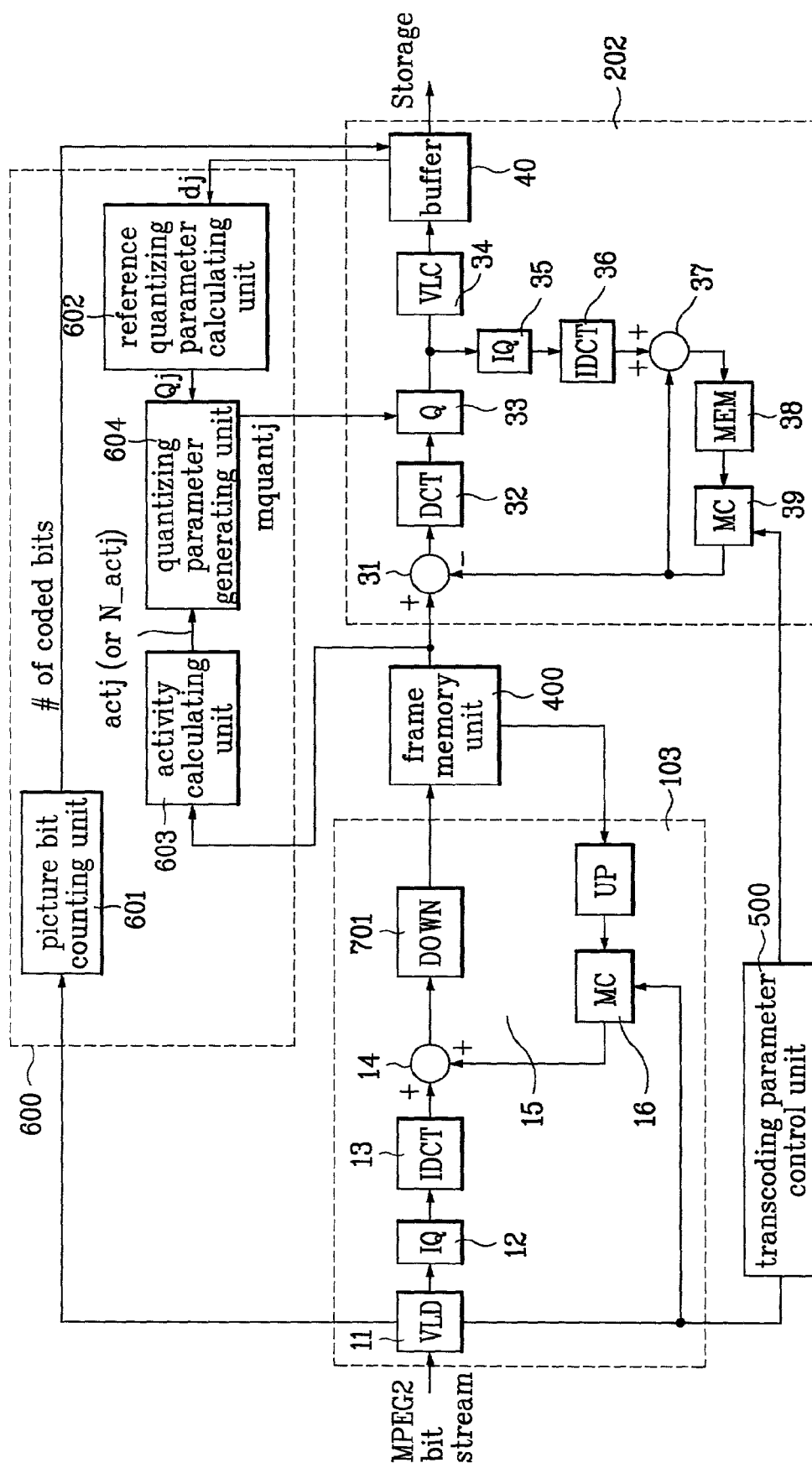
FIG. 8 illustrates a block diagram of a video transcoder according to a second embodiment of the present invention.

FIG. 8 illustrates a block diagram of a video transcoder according to a second embodiment of the present invention.

Referring to FIG. 8, the second embodiment of the present invention includes a down-sampling unit 701 and an up-sampling unit 702 in the video decoder 103 instead of the pre-processing unit 300 so as to reduce a bandwidth of a frame memory and a processing time greatly. In this case, blocks and devices having the same construction and operation in FIG. 2 are denoted by the same numerals, of which explanations are skipped in the following description.

Namely, macro blocks decoded out of the adder 14 pass through the down-sampling unit 701, thereby reducing resolution to ¼. Proportionally, a size of the frame memory 400 is reduced to ¼ as well. Accordingly, the present invention enables to reduce a bandwidth and a processing time of the frame memory 400 greatly.

In this case, a down-sampling method of the down-sampling unit 701 may use the method performed by the pre-processing unit 300 of the first embodiment. The frame memory 400 then has the memory structure of field units. Hence, a field-based uniform down-sampling result is attained when the frame and field pictures coexist in one sequence. Moreover, luminance and chrominance signals are separated to process so as to maintain the information about the field inside the memory in 75% reduction. In this case, the chrominance signal in the frame picture is divided into 4×8-sized top/bottom fields. Yet, the luminance signal is divided into 8×8-sized top/bottom fields. Therefore, an interlaced sequence enables to maintain the information of field units if fine video quality continuously.

As the resolution is reduced to ¼ through the down-sampling unit 701, the originally-decoded 16×16-sized macro block is naturally changed into 8×8-sized sub-blocks. Therefore, the macro block outputted to the video encoder 202 becomes one macro block by four merging originally-decoded macro blocks.

Looking into a transcoding process of I picture in FIG. 8, the IDCTed I picture is down-sampled in the down-sampling unit 701 and then outputted to the video encoder 202 through the frame memory 400. The encoding unit 202 carries out DCT and quantization on the inputted I picture, and then transports the I picture to the VLC unit 34. In this case, each macro block is intra-coded, and the quantizing unit 33 receives quantizing parameters from the bit rate control unit 600 so as to quantize the DCTed I picture. Meanwhile, for a P or B picture, a predictive motion compensation is carried out on a down-sampled video of low resolution. In this case, the down-sampled P or B picture is restored to its original state by the up-sampling unit 702, and then inputted to the motion compensating unit 16. The motion compensating unit 16 carries out frame prediction or field prediction in accordance with a motion type motion_type. The sum of the prdictively-compensated video and the IDCTed video is down-sampled by the down-sampling unit 701, and then inputted to the encoding unit 202 through the frame memory 400. The encoding unit 202 carries out DCT and quantization on a difference between the video compensated predictively by the motion compensating unit 39 and the currently-down-sampled video of low resolution, and then transports the DCT/quantized difference to the VLC unit 34.

Meanwhile, it is more effective to use the intact motion vector of a perfect resolution than to downscale the motion vector in vertical and horizontal directions in order to increase a video quality for the motion compensation in the video decoder 103. When using a motion vector MV of a perfect resolution, required is a process of up-sampling the macro block having the down-sampled resolution, which is stored in the frame memory 400, to have the original resolution. This up-sampling process is carried out by the up-sampling unit 702. The up-sampling unit 702 converts four pixels into 8 pixels through the inverse transformation of the sown-sampling unit 701, and then outputs the conversion to the motion compensating unit 16. Namely, the up-sampling unit 702 has a structure transformed into a prepositional matrix like a matrix type of the down-sampling unit 701.

Therefore, the present invention enables to store the MPEG-2 bit stream transported to a digital VCR or a DTV set-top box as well as convert a HD or SD-rated video signal of high bit rate into a bit stream of low bit rate.

And, the present invention enables to be installed at an appliance built in TV, an STB (set-top box) type appliance, and the like.

Moreover, the present invention is essential to applied fields having built-in storage devices such as digital TV, digital VCR, and the like, thereby strengthening technology competition in video recorder and digital TV having high performance.

Furthermore, the present invention is applicable to video servers, personal video recorders, and the like.

Specifically, the bit rate control unit according to the present invention is applicable to all kinds of video transcoders transporting a video signal by varying a bit rate thereof arbitrarily.

As mentioned in the above description, the video transcoding apparatus according to the present invention, when changing HD-rated MPEG sequence over 10 Mbps into NTSC-rated MPEG sequence below 6 Mbps, removes a motion-predicting process for motion compensation in an encoder suing video-decoded MPEG-2 parameters, thereby enabling to reduce time for motion compensation and calculation and complexity of hardware. Besides, the present invention enables to achieve reduction of storage capacity effectively as well as maintain excellent video quality.

Moreover, the present invention, when changing HD-rated MPEG sequence over 10 Mbps into NTSC-rated MPEG sequence below 6 Mbps, reduces calculation time and complexity of hardware using the bit rate control unit including the picture bit counting unit and the pre-processing unit or down-sampling unit. Besides, the present invention enables to achieve reduction of storage capacity effectively as well as maintain excellent video quality. Specifically, the present invention simplifies the bit allocation in the first step of the bit rate control unit, thereby enabling to improve the video quality as well as reduce hardware. Moreover, the present invention needs no information about GOP structure, thereby enabling to carry out instantly the bit allocation and quantization for the current picture.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A video transcoding apparatus comprising:
a video decoder to decode a compressed video bit stream so as to restore a pixel value of an original scene;
a video pre-processing unit having a predetermined matrix structure and down-sampling a macro block decoded by the video decoder by transforming the macro block into a corresponding picture structure, wherein the video pre-processing unit carries out down-sampling through a field based processing if the data decoded in the video decoder is a frame picture in an interlacing sequence and the video pre-processing unit carries out a down-sampling through a frame based processing if the data decoded in the video decoder is a field picture structure having a sequential scanning sequence or an interlacing sequence;
a frame memory storing the down-sampled macro block;
a transcoding parameter control unit detecting information about a picture from a previous bit stream variable-length-decoded by the video decoder and setting up an encoding mode for a transcoding in accordance with the detected information;
a video encoder encoding down-sampled data stored in the frame memory by a macro block unit in accordance with the encoding mode set up by the transcoding parameter control unit; and
a bit rate control unit controlling quantization of the video encoder by calculating a bit amount and the bit rate control unit determining a fullness of a buffer in the video encoder using the calculated bit amount, wherein the bit rate control unit includes a picture bit counting unit to calculate the bit amount encoded substantially for each picture in the video bit stream that is inputted to the video decoder and to be encoded currently and the picture bit counting unit determines the fullness of the buffer in the video encoder using a target bit number, wherein the target bit number for a picture to be encoded is based on the calculated bit amount calculated by the picture bit counting unit and the video bit stream that is variable-length-coded in the video encoder, wherein the bit rate control unit comprises:
a reference quantizing parameter calculating unit calculating a reference quantizing parameter in accordance with the buffer fullness outputted from the buffer;
an activity calculating unit producing an activity of a video outputted from the video decoder; and
a quantizing parameter generating unit generating a quantizing parameter to be used for a substantial quantization in accordance with the calculated reference quantizing parameter and the calculated activity so as to control a quantization of the video encoder, wherein the buffer finds the target bit number $T_2(k)$ in one picture of the video stream to be encoded currently using a following formula:

$$T_2(k) = T_1(k) \times \frac{R_2}{R_1},$$

where $k \in \{i,p,b\}$, $T_1(k)$ is the target bit number to allocate k-picture to group of pictures (GOP) and is found in the picture bit counting unit, $R_1$ is a bit rate of one sequence of the video stream inputted to the video decoder, and $R_2$ is a bit rate of one sequence of the video stream to be encoded.

2. The apparatus of claim 1, wherein the video pre-processing unit transforms an 8×8 block outputted from the video decoder into a 4×4 block using a following matrix:

$$\begin{bmatrix} y \\ y \\ y \\ y \\ 0 \\ 0 \\ 0 \\ 0 \end{bmatrix} = [P4^T] = \begin{bmatrix} X0 \\ X1 \\ X2 \\ X3 \\ X4 \\ X5 \\ X6 \\ X7 \end{bmatrix}, \text{ where } [P4] = \begin{bmatrix} T4 & 0 \\ 0 & 0 \end{bmatrix} / \sqrt{2},$$

[T4] is a 4-point DCT-based 4*4 DCT matrix, y denotes down-sampled 4×1 pixels, and X is 8 DCT coefficient blocks.

3. The apparatus of claim 2, wherein the video pre-processing unit carries out an 1-dimensional down-sampling using a following matrix:

$$y_{[4\times1]} = C_4^T \cdot X_{[8\times1]} = [T4^T 0]/\sqrt{2} \cdot [T8] \cdot x_{[8\times1]},$$

where x represents 8×1 pixels, y denotes down-sampled 4×1 pixels, and X is a DCT coefficient block for x, T8 is a 8×8 DCT based matrix, $$C_4 = \begin{bmatrix} T4 \\ 0 \end{bmatrix} / \sqrt{2},$$

and $C_4$ is a 4×4 DCT based matrix.

4. The apparatus of claim 2, wherein the video pre-processing unit carries out a down-sampling of a luminance signal using a following matrix:

$$y_{[4\times1]} = C_{4\times8} \cdot x_{[8\times1]},$$

where $C_{4\times8} = C_4^T \cdot T8$ is a 4×8-dimensional matrix and converts 8 pixels into 4 pixels.

5. The apparatus of claim 2, wherein the video pre-processing unit carries out a down-sampling of a chrominance signal using a following matrix:

$$y_{2\times1} = C_{2\times4} \cdot x_{[4\times1]},$$

where $C_{2\times4} = [T2\ 0]^T \cdot T4\sqrt{2}$ and T2 is a 2*2 DCT based matrix.

6. The apparatus of claim 1, wherein the transcoding parameter control unit establishes a motion vector and a motion mode of the macro block down-sampled by the video pre-processing unit using motion information of the previous bit stream variable-length-decoded by the video decoder.

7. The apparatus of claim 1, wherein the transcoding parameter control unit establishes a following video encoding reference and then sets up encoding parameters for a low resolution video of the video encoder:
   1) maintain a decoded picture coding type;
   2) maintain a decoded picture structure;
   3) maintain a decoded GOP (group of pictures);
   4) vary a decoded motion type or a macro block type;
   5) vary a decoded quantizing parameter;
   6) vary a decoded motion vector; and
   7) vary a decoded VBV_delay and a decoded VBV_buffer_size.

8. The apparatus of claim 7, wherein the transcoding parameter control unit controls the video encoder so as to intra-code macro blocks outputted from the frame memory if a currently-decoded picture coding type outputted from the video decoder is an I picture.

9. The apparatus of claim 7, wherein the transcoding parameter control unit determines whether to carry out a motion compensation through types of previously-decoded macro blocks corresponding to the macro block to be encoded currently if the currently-decoded picture coding type outputted from the video decoder is a P or B picture.

10. The apparatus of claim 9, wherein the transcoding parameter control unit controls the video encoder so as to intra-code the macro block to be encoded currently if at least three intra macro blocks exist in the previously-decoded four macro blocks corresponding to the macro block to be encoded currently.

11. The apparatus of claim 9, wherein the transcoding parameter control unit controls the video encoder so as to intra-code the macro block to be encoded currently if two macro blocks in a diagonal direction among four previously-decoded macro blocks corresponding to the macro block to be encoded currently are at intra mode.

12. The apparatus of claim 9, wherein the transcoding parameter control unit judges that a motion compensation is necessary if there are other conditions except those described in claims 10 and 11, and then distinguishes the P and B pictures from each other with the picture coding type.

13. The apparatus of claim 12, wherein average and median values of motion vectors of the previously-decoded macro blocks corresponding to the macro block to be encoded currently are found for the P picture and then the motion vector having a less mean absolute error (MAE) found from two vectors defined by the average value and median value respectively is selected as a motion compensating vector.

14. The apparatus of claim 13, wherein the video encoder encodes the macro block to be encoded currently as the intra mode if the selected MAE is greater than a predetermined value, and wherein the video encoder carries out the motion compensation by setting up the macro block type and the motion type fitting for the P picture if the selected MAE is less than the predetermined value and then encodes a difference between the motion-compensated macro block and the macro block to be encoded currently.

15. The apparatus of claim 12, wherein average and median values of forward and backward motion vectors of the previously-decoded macro blocks corresponding to the macro block to be encoded currently are found for the B picture and then a motion vector at a least one of mean absolute errors (MAE) found from four vectors defined by the average and mean values is selected as a motion compensating vector.

16. The apparatus of claim 15, wherein the video encoder encodes the macro block to be encoded currently as the intra mode if the selected MAE is greater than a predetermined value, and wherein the video encoder carries out the motion compensation by setting up the macro block type and the motion type fitting for the B picture if the selected MAE is less than the predetermined value and then encodes a difference between the motion-compensated macro block and the macro block to be encoded currently.

17. The apparatus of claim 1, wherein the picture bit counting unit detects a picture start code in the video stream inputted to the video decoder and counts to output a bit number between the detected picture start code and a next picture start code.

18. The apparatus of claim 1, wherein the buffer finds the buffer fullness $(d_j^i, d_j^p, d_j^b)$ of the respective pictures using a following formula:

$$d_j^i = d_0^i + B_{j-1} - \left\{ \frac{T_{2t} \times (j-1)}{MB\_cnt} \right\};$$

$$d_j^p = d_0^p + B_{j-1} - \left\{ \frac{T_{2p} \times (j-1)}{MB\_cnt} \right\}; \text{ and}$$

$$d_j^b = d_0^b + B_{j-1} - \left\{ \frac{T_{2b} \times (j-1)}{MB\_cnt} \right\},$$

where each of $(d_j^i, d_j^p, d_j^b)$ shows an initial fullness of a buffer of each of the pictures, $B_i$ is a bit number generated from encoding macro blocks up to the present including j, and MB_cnt represents a total number of the macro blocks in the picture.

19. The apparatus of claim 1, wherein the activity calculating unit receives an output of the frame memory, determines the activity of the macro block to be encoded currently, normalizes the activity, and outputs the normalized activity to the quantizing parameter generating unit, and wherein an initial value of an average value of the activities used for the activity normalization is set up by finding an average activity of a macro block to be decoded into an original resolution.

20. The apparatus of claim 1, wherein the bit rate control unit comprises:
the picture bit counting unit to calculate a bit amount encoded substantially for each picture in a video bit stream input to the video decoder;
a reference quantizing parameter calculating unit to calculate a reference quantizing parameter in accordance with a buffer fullness;
an activity calculating unit to produce an activity of a video output from the video decoder; and
a quantizing parameter generating unit to generate a quantizing parameter to be used for a substantial quantization in accordance with the calculated reference quantizing parameter and the calculated activity so as to control a quantization of the video encoder.

21. The apparatus of claim 20, wherein the picture bit counting unit detects a picture start code in the video stream input to the video decoder and outputs a bit number based on the detected picture start code and a next picture start code.

22. A video apparatus comprising:
a video decoder to decode a video bit stream;
a video pre-processing unit to down-sample a macro block decoded by the video decoder, wherein the video pre-processing unit to perform down-sampling using a field based processing when the data decoded in the video decoder corresponds to a frame picture and the video pre-processing unit to perform a down-sampling using a frame based processing when the data decoded in the video decoder corresponds to a field picture structure;
a frame memory to store the down-sampled macro block;
a transcoding parameter control unit to detect information about a picture from a previous bit stream decoded by the video decoder and to set up an encoding mode based on the detected information;
a video encoder to encode data stored in the frame memory by macro block units in accordance with the encoding mode set up by the transcoding parameter control unit; and
a bit rate control unit to control the video encoder by calculating a bit amount encoded by every picture among the bit stream to be decoded currently by the video decoder and the bit rate control unit to determine a fullness of the video encoder based on the calculated bit amount, wherein the bit rate control unit includes a picture bit counting unit to calculate the bit amount encoded substantially for each picture in the bit stream that is inputted to the video decoder and is to be encoded currently, wherein the fullness of the buffer in the video encoder is calculated using a target bit number, and the target bit number for a picture to be encoded is based on the bit amount calculated by the picture bit counting unit and the bit stream that is variable-length-coded in the video encoder, wherein the video pre-processing unit transforms the 8×8 block into the 4×4 block using a following matrix:

$$\begin{bmatrix} y \\ y \\ y \\ y \\ 0 \\ 0 \\ 0 \\ 0 \end{bmatrix} = [P4^T] = \begin{bmatrix} X0 \\ X1 \\ X2 \\ X3 \\ X4 \\ X5 \\ X6 \\ X7 \end{bmatrix}, \text{ where } [P4] = \begin{bmatrix} T4 & 0 \\ 0 & 0 \end{bmatrix} \Big/ \sqrt{2},$$

[T4] is a 4-point DCT-based 4*4 DCT matrix, y denotes down-sampled 4×1 pixels, and X is 8 DCT coefficient blocks.

23. The video apparatus of claim 22, wherein the video pre-processing unit performs down-sampling using the field based processing when the data corresponds to the frame picture in an interlacing sequence.

24. The video apparatus of claim 22, wherein the video pre-processing unit performs down-sampling using the frame based processing when the data corresponds to the field picture structure having a sequential scanning sequence or an interlacing sequence.

25. The video apparatus of claim 22, wherein the video pre-processing unit transforms an 8×8 block into a 4×4 block.

* * * * *